United States Patent [19]

Lin

[11] Patent Number: 5,205,643
[45] Date of Patent: Apr. 27, 1993

[54] LIGHTING EQUIPMENT

[76] Inventor: Steve Lin, No. 304, Chung Cheng South Road, Yung Kang Hsiang, Tainan Hsien, Taiwan

[21] Appl. No.: 958,921

[22] Filed: Oct. 9, 1992

[51] Int. Cl.5 .................. F21Y 21/08; F21Y 21/30
[52] U.S. Cl. ............................ 362/371; 362/387; 362/427
[58] Field of Search ............. 362/269, 287, 370, 371, 362/397, 418, 427, 432

[56] References Cited

U.S. PATENT DOCUMENTS

| | | | |
|---|---|---|---|
| 1,772,438 | 8/1930 | Garbs | 362/397 |
| 3,836,670 | 2/1976 | Allen, Sr. | 362/397 |
| 4,164,784 | 8/1979 | Jaksich | 362/371 |
| 4,527,224 | 7/1985 | Sangiamo et al. | 362/371 |
| 9,754,376 | 6/1988 | Winslow | 362/427 |

Primary Examiner—Richard R. Cole
Attorney, Agent, or Firm—Pro-Techtor International

[57] ABSTRACT

A lighting device including a reflector and a cap received in the front portion of a housing, a light bulb disposed on the reflector, and an electric board disposed in the housing. The lighting device is disposed in the car or the house and is energized before the user enters into the car or the house so that the interior of the car and the house can be clearly seen.

3 Claims, 3 Drawing Sheets

LIGHTING EQUIPMENT

BACKGROUND OF THE INVENTION (a) Field of the Invention

The present invention relates to a lighting device, and more particularly to a remote control lighting device.

(b) Description of the Prior Art

Generally, it is difficult to find a car when the car is parked in a very large parking lot; in addition, the interior of the car can be seen only after the door is opened, the driver can not find a person who is hidden in the rear portion of the car, this is very dangerous during the night. Furthermore, people can not see the interior of their house after the door is opened, the light is generally not turned on until after the homeowner enters his house; this is also dangerous if a thief is in the house.

The present invention has arisen to mitigate and/or obviate the afore-described disadvantages of the conventional problems.

SUMMARY OF THE INVENTION

The primary objective of the present invention is to provide a remote control lighting device for lighting the interior of a car or house before the users enter the car or the house.

In accordance with one aspect of the present invention, there is provided a lighting device comprising a cylindrical housing including a front portion having an annular flange provided therein and a rear portion and including a pair of shafts oppositely extended therefrom, a reflector received in the front portion of the housing and engaged with the annular flange, a cap received in the front portion of the housing and engaged with the reflector, a light bulb disposed on the reflector, a lid engaged on the rear portion of the housing, at least one suction cup attached to the lid for attaching the lighting device to any suitable surface, an electric means disposed in the housing and electrically connected to the light bulb for controlling the light bulb, and a bracket including a pair of lugs extended therefrom for engagement with the shafts of the housing and arranged such that the housing is rotatable about the shafts, at least one first engaging means formed beside the shafts of the housing, and at least one second engaging means formed in the lugs for engagement with the first engaging means of the housing in order to couple the housing relative to the bracket in any suitable angular position. The lighting device is provided for lighting the interior of the car or the house before the users enter into the car or the house.

Further objectives and advantages of the present invention will become apparent from a careful reading of the detailed description provided hereinbelow, with appropriate reference to the accompanying drawings.

DETAILED DESCRIPTION OF THE INVENTION

Figure 1:
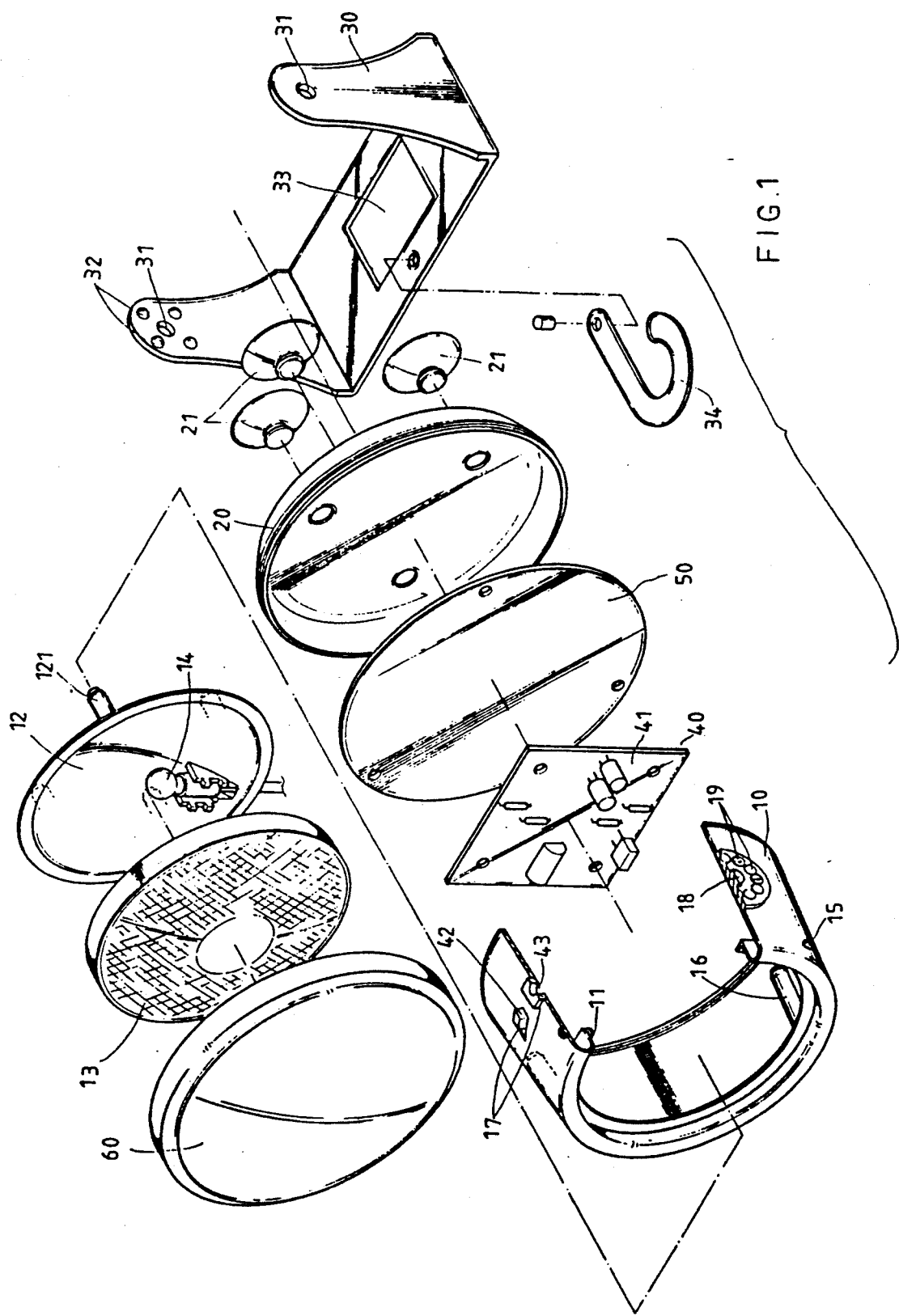
FIG. 1 is an exploded view of a lighting device in accordance with the present invention.
Figure 2:
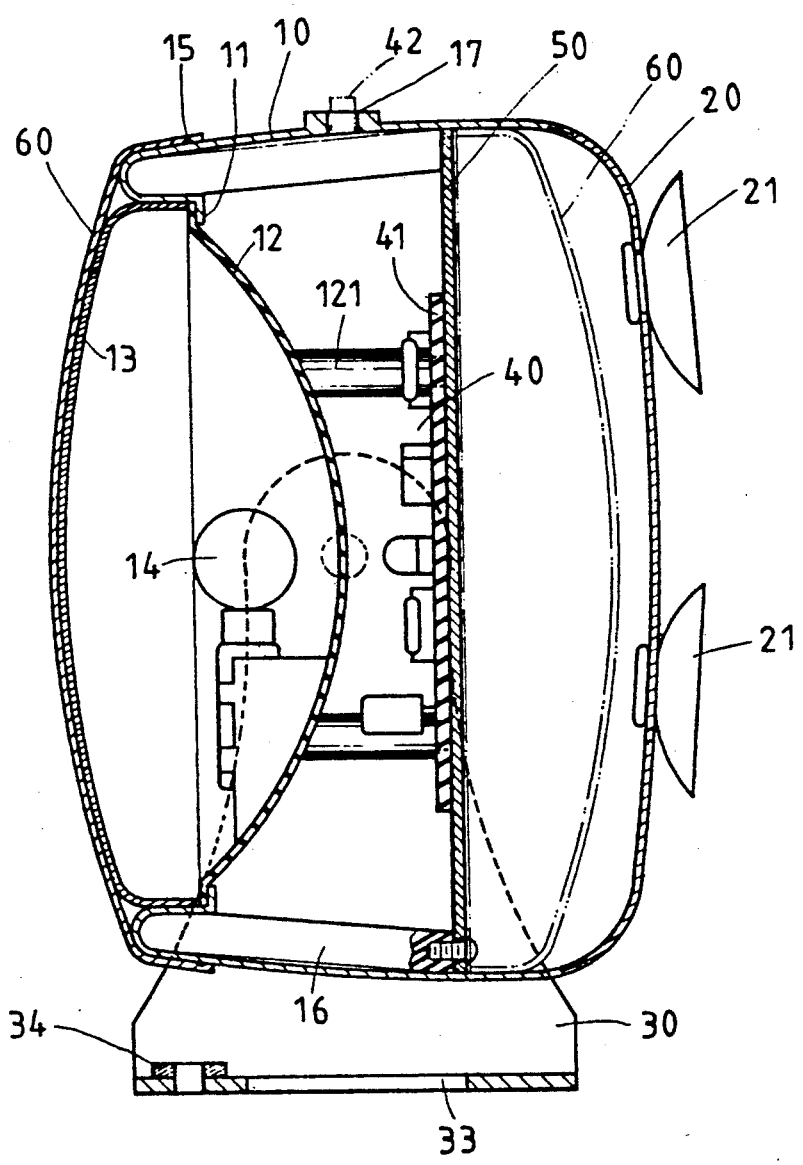
FIG. 2 is a cross sectional view of the lighting device.
Figure 3:
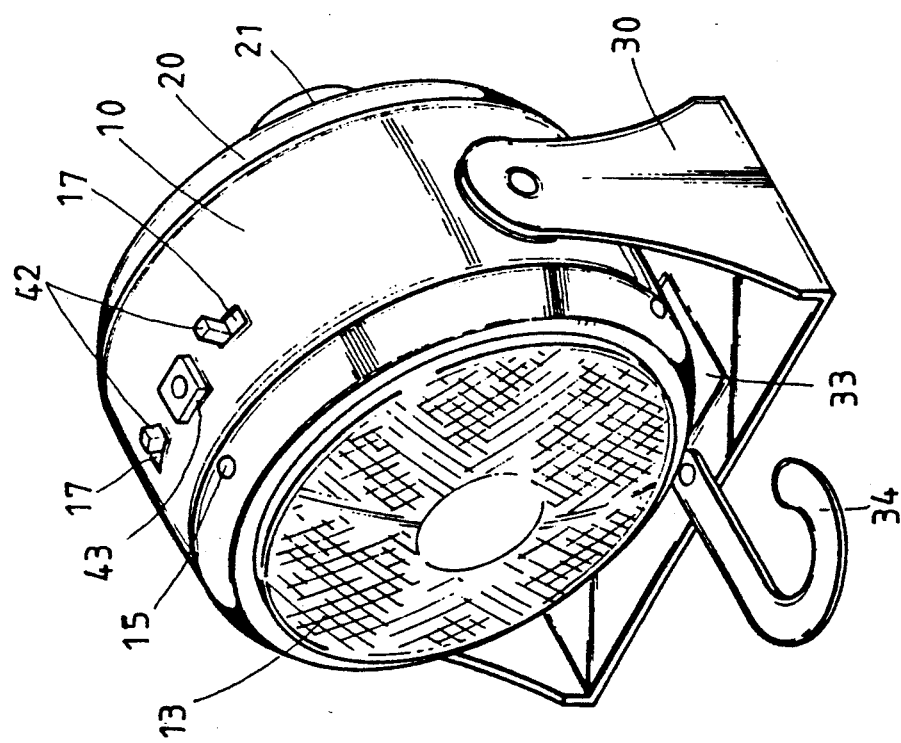

Referring to the drawings and initially to FIGS. 1 to 3, a lighting device in accordance with the present invention comprises generally a cylindrical housing 10 having an annular flange 11 extended inwards from the front portion thereof, a reflector 12 received in the front portion of the housing 10 and engaged with the annular flange 11 of the housing 10, a cap 13 received in the front portion of the housing 10 and engaged with the reflector 12, a light bulb 14 disposed in the middle portion of the reflector 12, a number of extensions 121 extended rearwards from the reflector 12, the housing 10 including a plurality of protrusions 15 formed on the front portion of the outer peripheral portion thereof, a cover 60 engaged on the front portion of the housing 10 and engaged with the projections 15 for enclosing the cap 13 and the reflector 12, a number of ribs 16 formed in the inner portion thereof, a number of openings 17 formed therein, a pair of shafts 18 oppositely extended outwards from the housing 10, and a number of depressions 19 formed around each of the shafts 18.

A board 50 is engaged in the housing 10 and fixed to the ribs 16, a lid 20 encloses the rear portion of the housing 10 and includes three suction cups 21 disposed thereon for attachment onto the glass, the flat surfaces or the wall of either the car or the house; the cover 60 can be received in the rear portion of the housing 10, best shown in FIG. 2; an electric device 40 is electrically connected to the light bulb 14 and includes an electric board 41 fixed to the extensions 121 of the reflector 12 and a switch button 42 and a socket 43 engaged in the openings 17 of the housing 10, the socket 43 is provided for connecting to an electric source, the switch button 42 is provided to control and to select the functions of the lighting device, for example, the energized time of the light bulb, and the flashing function of the light bulb. The electric device 40 further includes a receiver, an amplifier, a decoding means, cpu, flashing means, electric source, etc. and a remote control device for actuating the electric device 40; the light bulb 14 can either be energized for a period of time or energized intermittently with the option of the user, these electric parts are commercially available and will not be described in further details.

Figure 4:
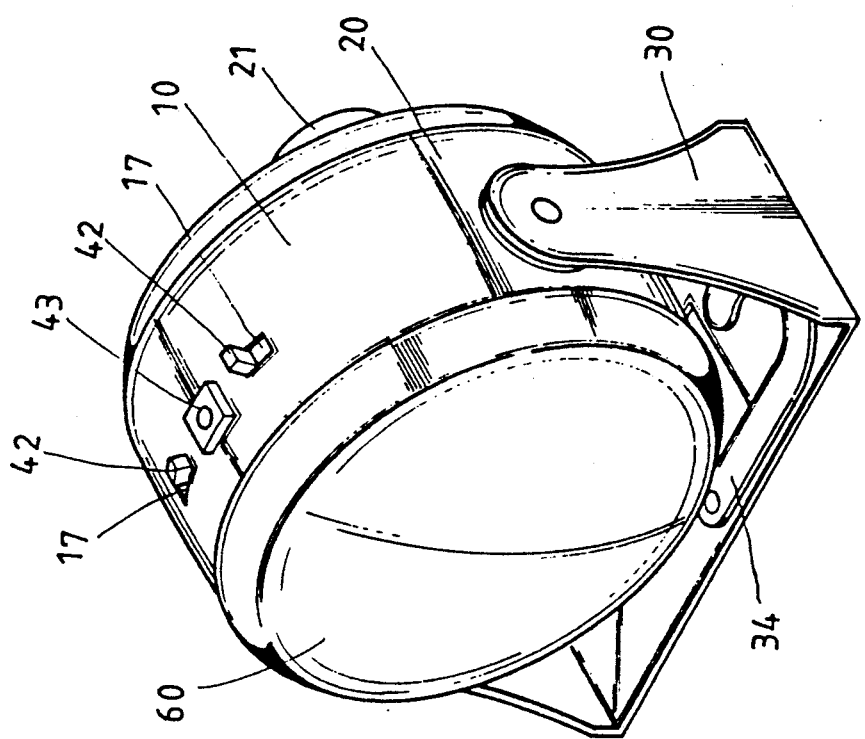
FIGS. 3 and 4 are perspective views of the lighting device.

A U-shaped bracket 30 includes two lugs extended upward therefrom each having a hole 31 formed therein for receiving the shafts 18 of the housing 10 so that the housing 10 is rotatable about the shafts 18, at least one projections 32 provided beside the hole 31 for engagement in the depressions 19 of the housing 10 such that the housing 10 can be held in place relative to the bracket 30 at any suitable angular position by the engagement between the projection 32 and the depressions 19. A notch 33 is formed in the bottom of the bracket 30 and a hook 34 is disposed in the bottom of the bracket 30, both of the notch 33 and the hook 34 are provided for attaching the lighting device onto any projecting means, such as a nail on the wall, or a hook element in the upper portion of the car. The hook 34 can be received in the bracket 30, as shown in FIG. 4.

In operation, the lighting device can be attached to the glass of the car and can be connected to the battery of the car, the lighting device is energized when the user wants to use and to open the car. In addition, the lighting device can be disposed in the interior of the house and plugged to the electric source, the lighting device is energized when the user wants to enter into the house.

Accordingly, the lighting device in accordance with the present invention may light the interior of either the car or the house before the user wants to enter into the car or the house.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A lighting device comprising a cylindrical housing including a front portion having an annular flange provided therein and a rear portion and including a pair of shafts oppositely extended therefrom, a reflector received in said front portion of said housing and engaged with said annular flange, a cap received in said front portion of said housing and engaged with said reflector, a light bulb disposed on said reflector, a lid engaged on said rear portion of said housing, at least one suction cup attached to said lid for attaching said lighting device to any suitable surface, an electric means disposed in said housing and electrically connected to said light bulb for controlling said light bulb, and a bracket including a pair of lugs extended therefrom for engagement with said shafts of said housing and arranged such that said housing is rotatable about said shafts, at least one first engaging means formed beside said shafts of said housing, and at least one second engaging means formed in said lugs for engagement with said first engaging means of said housing in order to couple said housing relative to said bracket in any suitable angular position.

2. A lighting device comprising a cylindrical housing including a front portion having an annular flange provided therein and a rear portion and including a pair of shafts oppositely extended therefrom, a reflector received in said front portion of said housing and engaged with said annular flange, a cap received in said front portion of said housing and engaged with said reflector, a cover engaged on said front portion of said housing for enclosing said cap and said reflector, a light bulb disposed on said reflector, a lid engaged on said rear portion of said housing, at least one suction cup attached to said lid for attaching said lighting device to any suitable surface, an electric means disposed in said housing and electrically connected to said light bulb for controlling said light bulb, and a bracket including a pair of lugs extended therefrom for engagement with said shafts of said housing and arranged such that said housing is rotatable about said shafts, a notch formed in said bracket and a hook fixed to said bracket, at least one first engaging means formed beside said shafts of said housing, and at least one second engaging means formed in said lugs for engagement with said first engaging means of said housing in order to couple said housing relative to said bracket.

3. A lighting device comprising a cylindrical housing including a front portion having an annular flange provided therein and a rear portion and including a pair of shafts oppositely extended therefrom, a plurality of depressions formed around each of said shafts, a reflector received in said front portion of said housing and engaged with said annular flange, a cap received in said front portion of said housing and engaged with said reflector, a cover engaged on said front portion of said housing for enclosing said cap and said reflector, a light bulb disposed on said reflector, a lid engaged on said rear portion of said housing, at least one suction cup attached to said lid for attaching said lighting device to any suitable surface, an electric means disposed in said housing and electrically connected to said light bulb for controlling said light bulb, and a bracket including a pair of lugs extended therefrom for engagement with said shafts of said housing and arranged such that said housing is rotatable about said shafts, a notch formed in said bracket and a hook fixed to said bracket, at least one projection formed on each of said lugs for engagement with said depressions of said housing in order to couple said housing relative to said bracket in any suitable angular position.

* * * * *

UNITED STATES PATENT AND TRADEMARK OFFICE
CERTIFICATE OF CORRECTION

PATENT NO. : 5,205,643

DATED : April 27, 1993

INVENTOR(S) : Steve Lin

It is certified that error appears in the above-identified patent and that said Letters Patent is hereby corrected as shown below:

On the title page, items [19] and [76] Inventors: "Lin" should read --Liu--

Signed and Sealed this

Seventh Day of November, 1995

Attest:

BRUCE LEHMAN

*Attesting Officer*      *Commissioner of Patents and Trademarks*